US012006733B2

(12) United States Patent
Chen et al.

(10) Patent No.: US 12,006,733 B2
(45) Date of Patent: Jun. 11, 2024

(54) DOOR LOCK DEVICE

(71) Applicant: THASE ENTERPRISE CO., LTD., New Taipei (TW)

(72) Inventors: Jui-Ming Chen, New Taipei (TW); Ching-Tien Lin, New Taipei (TW)

(73) Assignee: THASE ENTERPRISE CO., LTD., New Taipei (TW)

( * ) Notice: Subject to any disclaimer, the term of this patent is extended or adjusted under 35 U.S.C. 154(b) by 233 days.

(21) Appl. No.: 17/065,276

(22) Filed: Oct. 7, 2020

(65) Prior Publication Data

US 2021/0285260 A1 Sep. 16, 2021

(30) Foreign Application Priority Data

Mar. 12, 2020 (TW) ................................ 109202828

(51) Int. Cl.
*E05B 65/10* (2006.01)

(52) U.S. Cl.
CPC ..... *E05B 65/1006* (2013.01); *E05Y 2900/132* (2013.01)

(58) Field of Classification Search
CPC ............ Y10T 292/57; Y10T 292/0908; Y10T 292/0909; Y10T 292/091; Y10T 292/0801; Y10T 292/0803; Y10T 292/0805; Y10T 292/0806; Y10T 292/0834; Y10T 292/0836; Y10T 292/0837; Y10T 292/0838; Y10T 292/0839; Y10T 292/084; Y10T 292/0845; Y10T 292/0848; Y10T 292/0849; Y10T 292/0851; Y10T 292/0852; Y10T 292/0853; Y10T 292/0854; Y10T 292/0859; E05B 65/1006; E05B 65/10; E05B 65/1013; E05B 65/1046; E05B 65/1053; E05Y 2900/132; E05C 9/00; E05C 9/002; E05C 9/008; E05C 9/04; E05C 9/042; E05C 9/043; E05C 9/046; E05C 9/048; E05C 9/10; E05C 9/14;

(Continued)

(56) References Cited

U.S. PATENT DOCUMENTS 3,788,687 A * 1/1974 Zawadzki ............... E05B 63/20
292/92
4,295,673 A * 10/1981 Miller ................. E05B 65/1046
49/141

(Continued)

FOREIGN PATENT DOCUMENTS

| | | | | | |
|---|---|---|---|---|---|
| EP | 3564468 | A1 | * | 11/2019 | ........... E05B 63/042 |
| TW | 453712 | U | * | 5/2013 | ......... E05B 65/1006 |
| TW | M595150 | U | * | 3/2020 | ......... E05B 65/1006 |

*Primary Examiner* — Kristina R Fulton
*Assistant Examiner* — Steven A Tullia
(74) *Attorney, Agent, or Firm* — Kelly & Kelley, LLP

(57) ABSTRACT

A door lock device is provided and includes: a lock assembly having a first lock structure and a second lock structure; an acting assembly interlocked with the first lock structure and the second lock structure; and an operation assembly interlocked with the acting assembly so as to unlock the first lock structure and the second lock structure synchronously. Therefore, when the lock assembly is in the form of top and bottom locks, the top and bottom locks can be unlocked at the same time, so as to allow an escape door to be opened quickly, thereby facilitating emergency escape.

11 Claims, 13 Drawing Sheets

(58) Field of Classification Search
CPC . E05C 9/16; E05C 9/18; E05C 9/1825; E05C 9/1875; E05C 9/1883; E05C 9/22
See application file for complete search history.

(56) References Cited

U.S. PATENT DOCUMENTS

| | | | | | |
|---|---|---|---|---|---|
| 4,601,499 | A * | 7/1986 | Kim | E05C 9/20 292/DIG. 60 |
| 5,114,192 | A * | 5/1992 | Toledo | E05B 63/20 292/21 |
| 5,154,454 | A * | 10/1992 | Hollaway | E05B 65/1046 292/DIG. 60 |
| 5,524,942 | A * | 6/1996 | Fleming | E05C 9/047 292/DIG. 21 |
| 6,820,905 | B1 * | 11/2004 | Haeck | E05B 65/1013 70/92 |
| 7,641,244 | B2 * | 1/2010 | Lin | E05B 65/106 292/92 |
| 8,146,962 | B2 * | 4/2012 | Lu | E05B 65/1006 292/93 |
| 8,267,441 | B2 * | 9/2012 | Lin | E05B 17/002 292/145 |
| 10,415,271 | B2 * | 9/2019 | Graham | E05B 53/003 |
| 2004/0227351 | A1 * | 11/2004 | Lin | E05B 65/1006 292/92 |
| 2009/0194999 | A1 * | 8/2009 | Shen | E05B 63/0056 292/219 |
| 2010/0066101 | A1 * | 3/2010 | Shen | E05B 65/1006 292/21 |
| 2010/0066102 | A1 * | 3/2010 | Shen | E05B 65/1006 292/92 |
| 2011/0198871 | A1 * | 8/2011 | Lu | E05C 9/1875 292/195 |
| 2012/0242092 | A1 * | 9/2012 | Frolov | E05B 65/1093 292/92 |
| 2016/0069107 | A1 * | 3/2016 | Uyeda | E05B 17/002 292/145 |
| 2016/0168879 | A1 * | 6/2016 | Chen | E05B 65/1006 292/138 |
| 2017/0081882 | A1 * | 3/2017 | Lin | E05B 65/1006 |
| 2017/0191288 | A1 * | 7/2017 | Lin | E05B 65/1006 |
| 2017/0292293 | A1 * | 10/2017 | Lin | E05C 3/16 |
| 2019/0352937 | A1 * | 11/2019 | McKibben | E05B 65/1093 |
| 2020/0040602 | A1 * | 2/2020 | Lin | E05C 19/028 |

* cited by examiner

DOOR LOCK DEVICE

CROSS-REFERENCE TO RELATED APPLICATIONS

This application claims priority to Taiwan Application Serial No. 109202828, filed on Mar. 12, 2020. The entirety of the application is hereby incorporated by reference herein and made a part of this specification.

BACKGROUND

1. Technical Field

The present disclosure relates to locks, and more particularly, to a door lock device for an escape door.

2. Description of Related Art

To prevent a thief invasion, an escape door is usually equipped with top and bottom locks to strengthen the door lock mechanism.

However, in operation, the top and bottom locks need to be unlocked separately. Therefore, when escaping under emergency, a user needs to unlock the top and bottom locks separately and then opens the escape door by pushing a handle thereof, thus wasting a lot time and adversely affecting the emergency escape.

Therefore, how to overcome the above-described drawbacks has become an urgent issue in the art.

SUMMARY

In view of the above-described drawbacks, the present disclosure provides a door lock device, which comprises: a lock assembly comprising a first lock structure and a second lock structure; an acting assembly interlocked with the first lock structure and the second lock structure; and an operation assembly interlocked with the acting assembly to unlock the first lock structure and the second lock structure synchronously.

In an embodiment, the lock assembly is in the form of top and bottom locks, wherein the first lock structure is a top lock and the second lock structure is a bottom lock.

In an embodiment, the acting assembly comprises a driving member interlocked with the operation assembly and an acting member interlocked with the driving member. For example, the driving member pushes the acting member in a rotatable manner. In an embodiment, the acting member has an acting body interlocked with the driving member and an acting portion disposing the acting body and interlocked with the lock assembly. As such, the driving member pushes the acting body to cause the acting portion to move synchronously with the first lock structure and the second lock structure.

In an embodiment, the acting assembly is provided with a bump and the operation assembly is provided with a rail cooperating with the bump to allow the bump to displace in the rail, thereby causing the operation assembly to displace relative to the acting assembly and move the acting assembly.

In an embodiment, the operation assembly comprises at least one actuating mechanism and one interlocking mechanism interlocking the actuating mechanism and the driving member. For example, the actuating mechanism has a rotating member, an actuating member and a fastening member, wherein the rotating member has a wing portion with a first arm portion and a second arm portion connected to different sides of the wing portion, the wing portion is connected to the fastening member, the first arm portion is connected to the actuating member, and the second arm portion is connected to the interlocking mechanism. In an embodiment, the interlocking mechanism has an interlocking member connected to the actuating mechanism and a passive member connected to the interlocking member, wherein one side of the passive member is connected to the interlocking member and another side of the passive member is displaceably connected to the acting assembly.

In an embodiment, the door lock device further comprises a handle assembly encapsulating the operation assembly.

According to the present disclosure, the acting assembly is interlocked with the first lock structure and the second lock structure so as to allow the first lock structure and the second lock structure to be unlocked synchronously. As such, when the lock assembly is in the form of top and bottom locks, the top and bottom locks can be unlocked at the same time so as to allow an escape door to be opened quickly, thereby facilitating emergency escape.

BRIEF DESCRIPTION OF THE DRAWINGS

FIG. 4A' is a schematic partial rear view of a door lock device in operation according to the present disclosure.

DETAILED DESCRIPTION

The following illustrative embodiments are provided to illustrate the present disclosure. These and other advantages and effects can be apparent to those in the art after reading this specification.

It should be noted that all the drawings are not intended to limit the present disclosure. Various modifications and variations can be made without departing from the spirit of the present disclosure. Further, terms such as "up," "down," "front," "rear," "left," "right," "a," etc., are merely for illustrative purposes and should not be construed to limit the scope of the present disclosure.

Figure 1A:
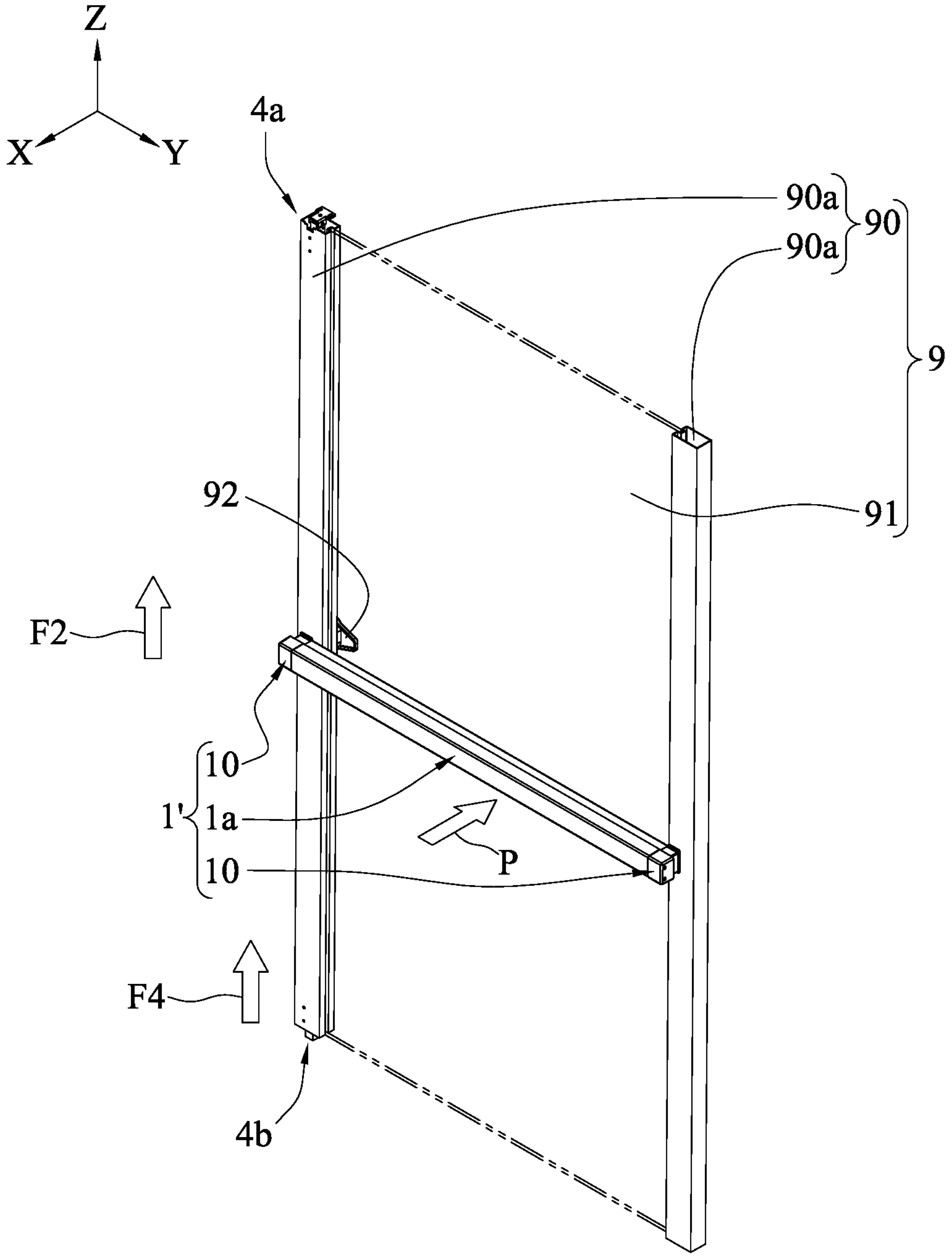
FIG. 1A is a schematic front perspective view of a door lock device in use according to the present disclosure.
Figure 1B:
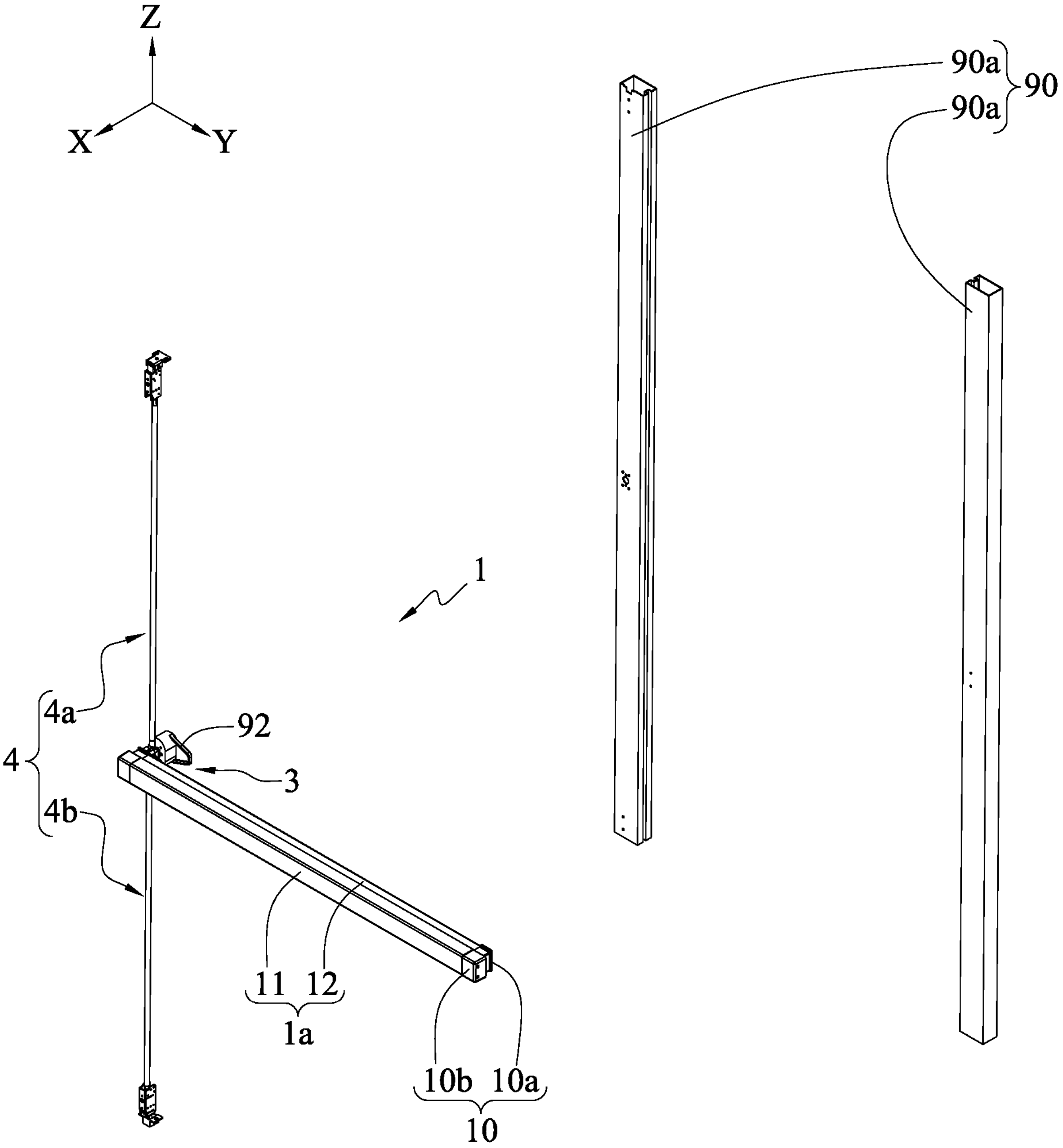
FIG. 1B is a schematic partially exploded perspective view of FIG. 1A.
Figure 1C:
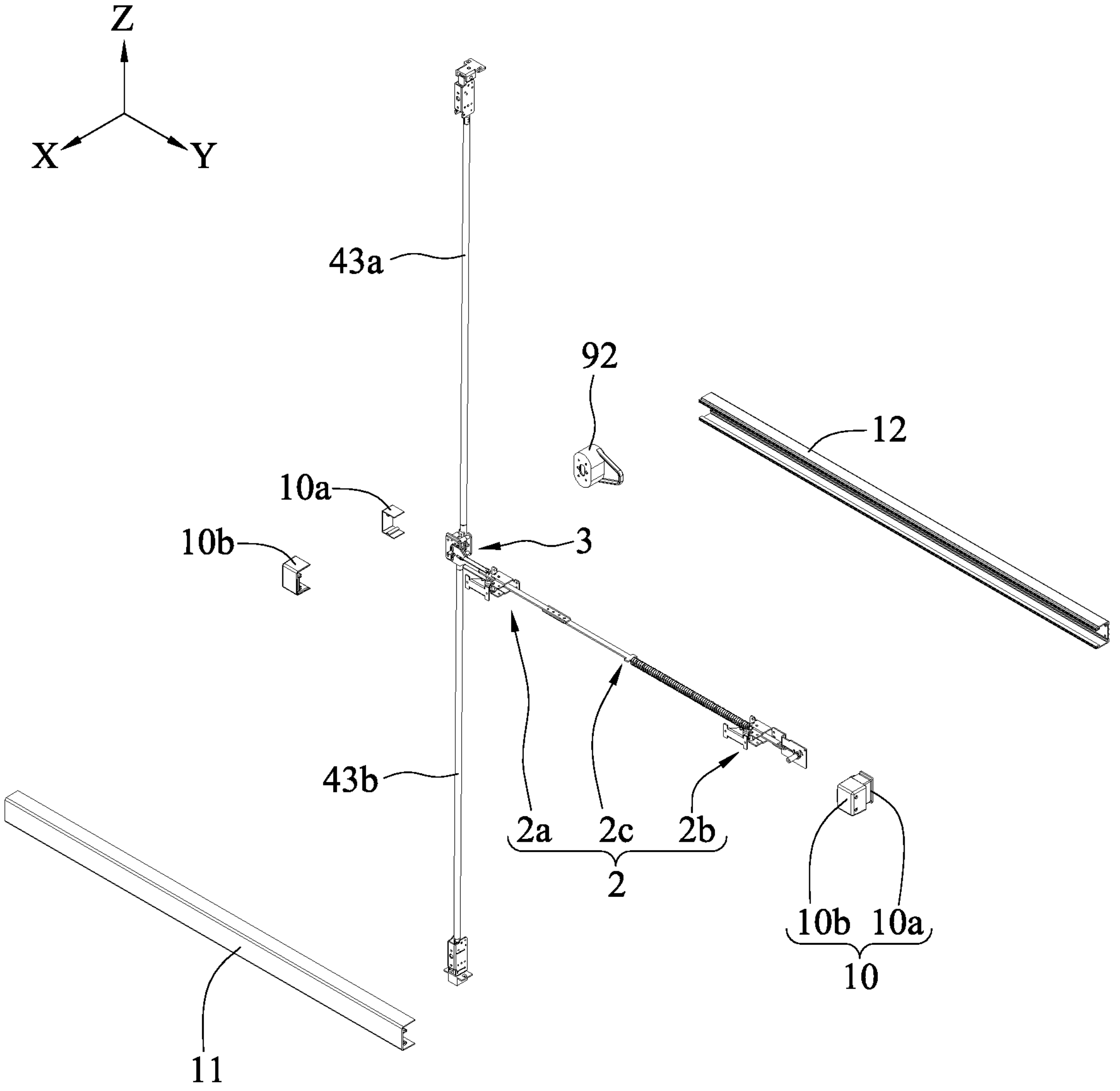
FIG. 1C is a schematic partially exploded perspective view of FIG. 1A.

FIGS. 1A, 1B and 1C are schematic views showing application of a door lock device 1 to a door structure 9 according to the present disclosure. As shown in FIGS. 1A, 1B and 1C, the door structure 9 includes a set of door frame 90 corresponding in size to a door opening, a door plate 91 (shown in dashed lines) attached to the door frame 90, and a handle 92 for opening and closing the door plate 91. The door lock device 1 is, for example, a headless top-bottom fireproof door lock, which has a lock assembly 4 buried in the door frame 90, an acting assembly 3 disposed on the door frame 90 and interlocked with the lock assembly 4, an operation assembly 2 disposed outside the door frame 90 and the door plate 91 and interlocked with the acting assembly 3, and a handle assembly 1 encapsulating the operation assembly 2.

In an embodiment, a front or rear direction such as an arrow direction X is defined along an entry or exit direction of the door, a left or right direction such as an arrow direction Y is defined along a direction of a short side of the door plate 91, and an up or down direction such as an arrow direction Z is defined along a direction of a height of the door plate 91. It should be noted that the arrow directions X, Y and Z are used for illustrative purposes and not intended to limit the present disclosure.

Further, the door plate 91 is a rectangular plate body. The door frame 90 has vertical hollow rod bodies 90*a* arranged at the left and right sides of the door plate 91, respectively. The lock assembly 4 and the acting assembly 3 are correspondingly located at one of the rod bodies 90*a*, and the operation assembly 2 is disposed on the two rod bodies 90*a* and across the door plate 91 (approximately at the middle of the door plate 91).

Furthermore, the handle 92 is disposed at the rear side of the door plate 91 corresponding to the acting assembly 3, and the handle assembly 1' is disposed at the front side of the door plate 91. The handle assembly 1' has a handle structure 1*a* and a plurality of fastening structures 10 respectively arranged on outer surfaces of the two rod bodies 90*a* and engaged with the handle structure 1*a*. For example, the handle structure 1*a* has a handle portion 11 and a cover portion 12 cooperating with one another. Each of the fastening structures 10 has a positioning portion 10*a* and a base portion 10*b* connected to the positioning portion 10*a*. The fastening structures 10 are fastened to the door frame 90 through the positioning portions 10*a*, the cover portion 12 is securely connected to the positioning portions 10*a*, and the handle portion 11 is displaceably engaged to the base portions 10*b* so as to be displaceable along the front or rear direction (for example, the arrow direction X) relative to the base portions 10*b*. The handle portion 11 and the cover portion 12 cooperatively form a long hollow tube body corresponding to the operation assembly 2, and the positioning portion 10*a* and the base portion 10*b* are combined into a groove body with its opening correspondingly receiving an end of the long hollow tube body. The handle assembly 1' has a lot of specific parts, which are well known in the art and detailed description thereof are omitted herein.

The operation assembly 2 has at least one actuating mechanism (two sets of actuating mechanisms 2*a*, 2*b* are provided in the embodiment) and an interlocking mechanism 2*c* interlocking the actuating mechanisms 2*a*, 2*b*.

Figure 2A:
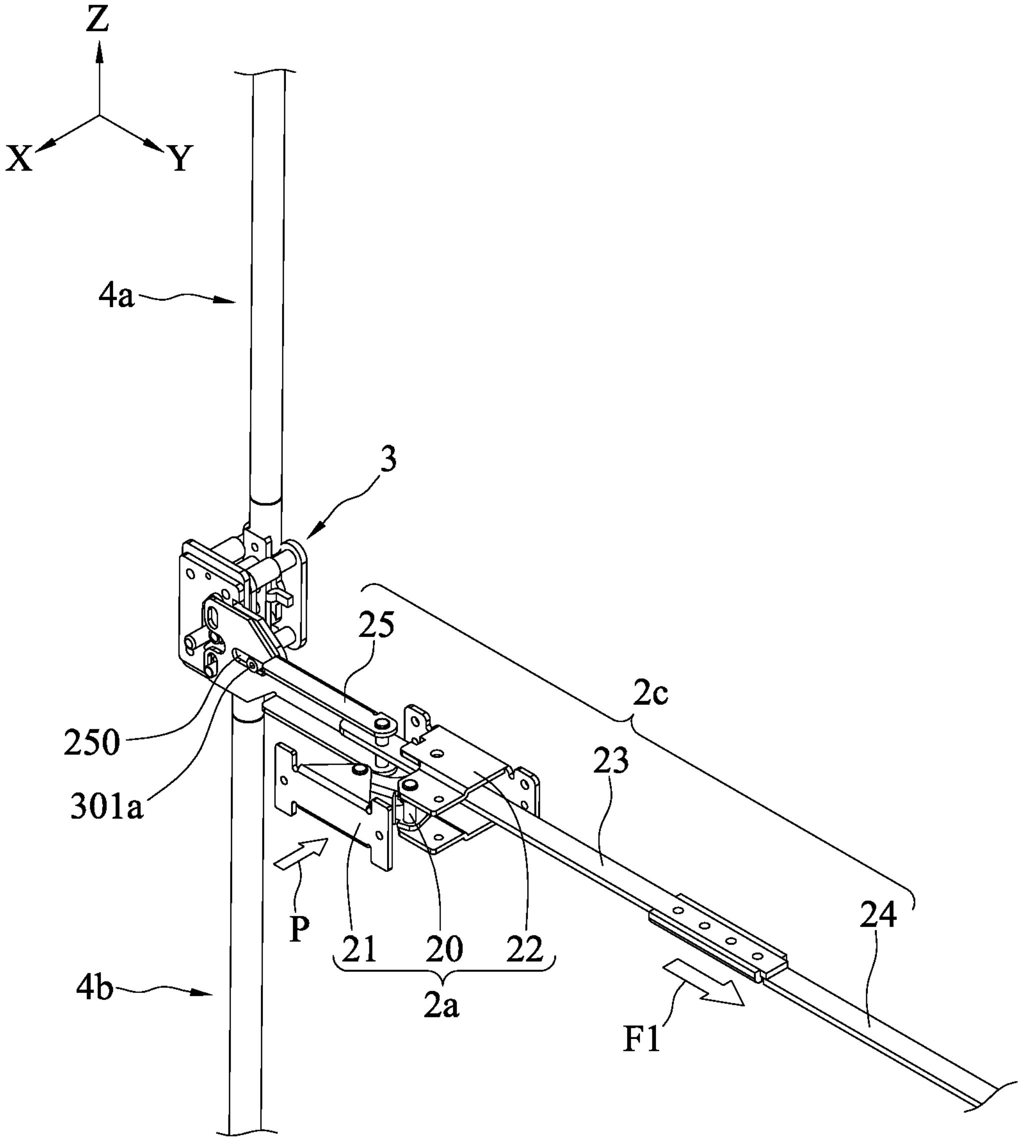
FIG. 2A is a schematic partial front perspective view of a door lock device according to the present disclosure.
Figure 2B:
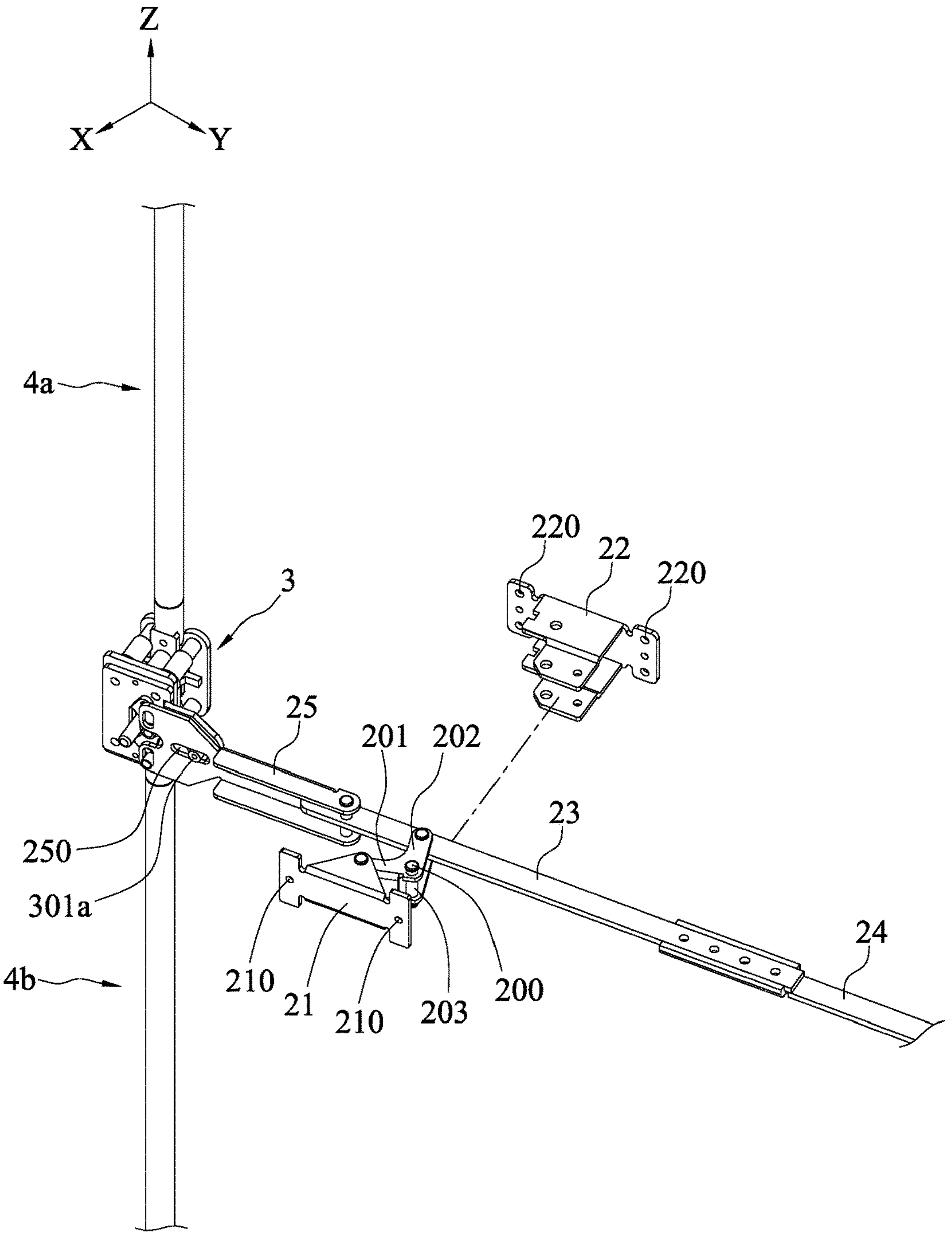
FIG. 2B is a schematic exploded perspective view of FIG. 2A.

In an embodiment, the operation assembly 2 is substantially arranged along the width of the door plate 91 (for example, in the arrow direction Y) and is provided with two sets of actuating mechanisms 2*a*, 2*b*, as shown in FIG. 1C. Referring to FIGS. 2A and 2B, a set of the actuating mechanism 2*a* has a rotating member 20, an actuating member 21 connected to the handle portion 11 through such as fastening holes 210, and a fastening member 22 connected to the cover portion 12 through such as fastening holes 220. The rotating member 20 has a wing portion 200, and a first arm portion 201 and a second arm portion 202 connected to different sides of the wing portion 200. As such, the wing portion 200 is axially connected to the fastening member 22 through such as a shaft member 203, the first arm portion 201 is axially connected to the actuating member 21, and the second arm portion 202 is connected to the interlocking mechanism 2*c*. For example, the rotating member 20 is substantially in the form of a boomerang and the fastening member 22 is in the form of a clamping opening so as to allow the interlocking mechanism 2*c* to pass through the clamping opening of the fastening member 22. Similarly, the other set of the actuating mechanism 2*b* has substantially the same configuration.

The interlocking mechanism 2*c* has an interlocking member 23 connected to the actuating mechanism 2*a* (the second arm portion 202 thereof), a passive member 25 connected to one end of the interlocking member 23, a connecting member 24 connecting the other actuating mechanism 2*b* (the second arm portion 202 thereof) and the other end of the interlocking member 23. Therefore, the second arm portions 202 of the two sets of actuating mechanisms 2*a*, 2*b* are connected to the interlocking member 23 and the connecting member 24, respectively, so as to interlock the actuating mechanisms 2*a*, 2*b*. For example, the interlocking member 23 and the connecting member 24 are rod bodies, one side of the passive member 25 is connected to the interlocking member 23 and the other side of the passive member 25 is displaceably disposed on the acting assembly 3. The passive member 25 is provided with a rail 250 cooperating with the acting assembly 3 and a bump 301*a* corresponding to the rail 250 is provided on the acting assembly 3. The bump 301*a* can displace in the rail 250 so as to allow the passive member 25 to displace relative to the acting assembly 3.

Figure 3A:
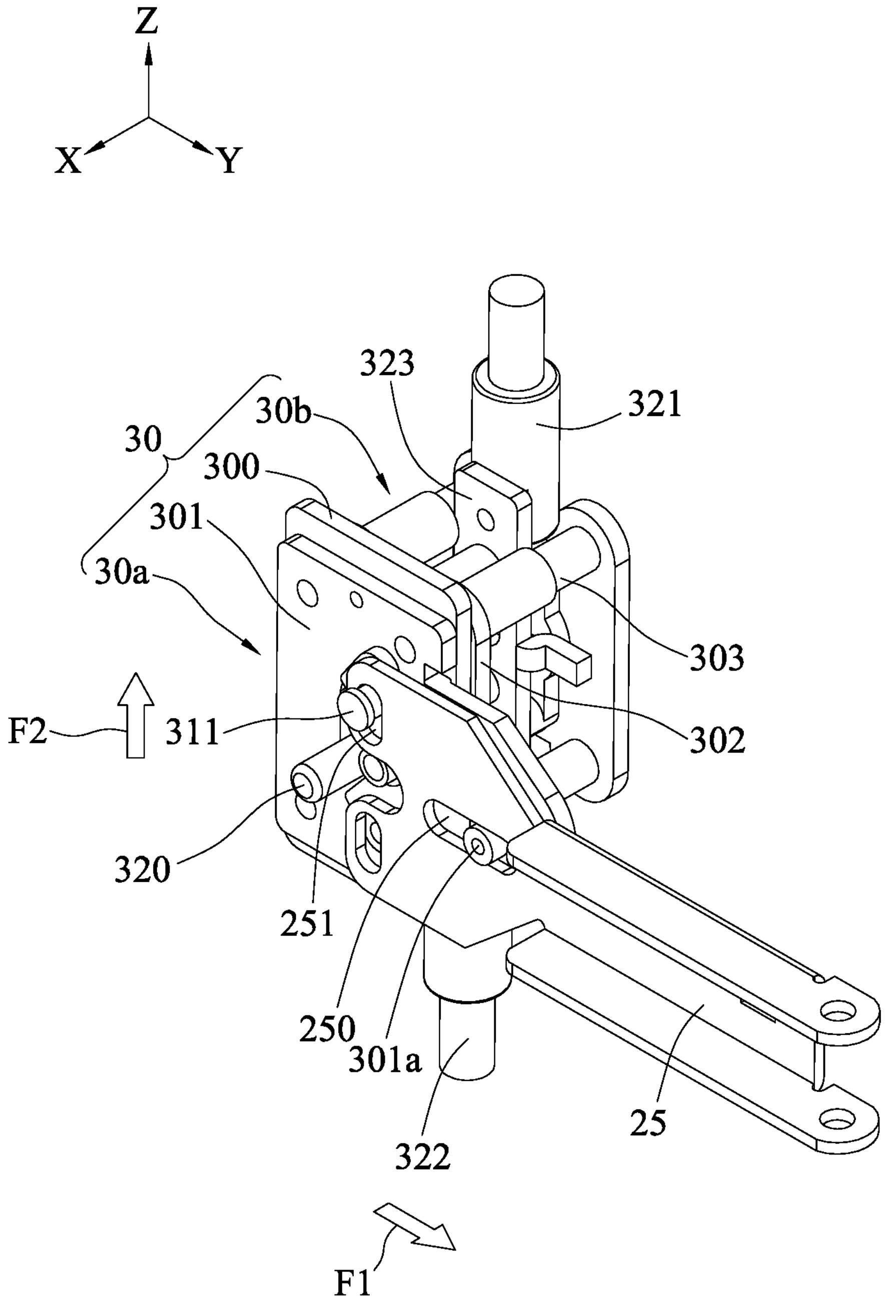
FIG. 3A is a schematic partial front perspective view of a door lock device according to the present disclosure.
Figure 3A:
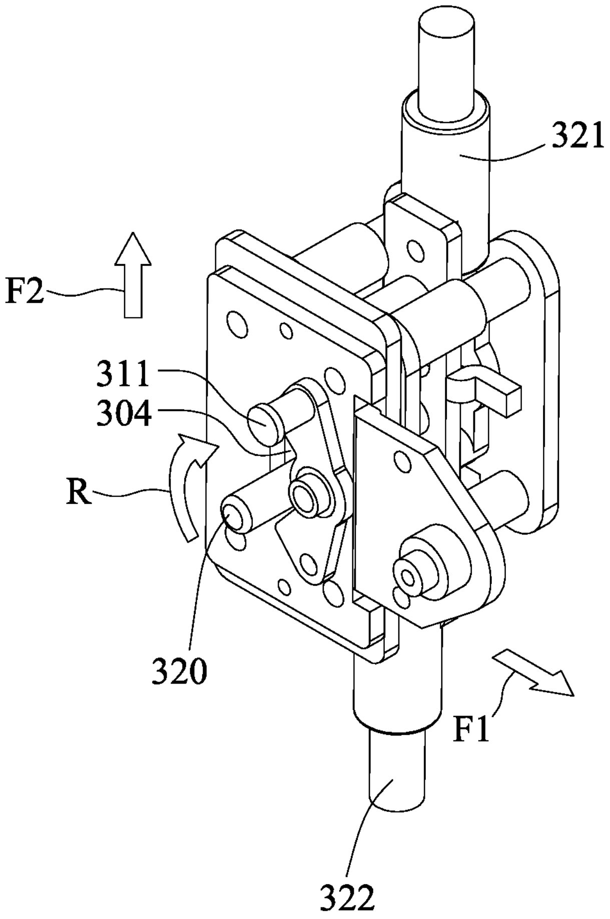
Figure 3B:
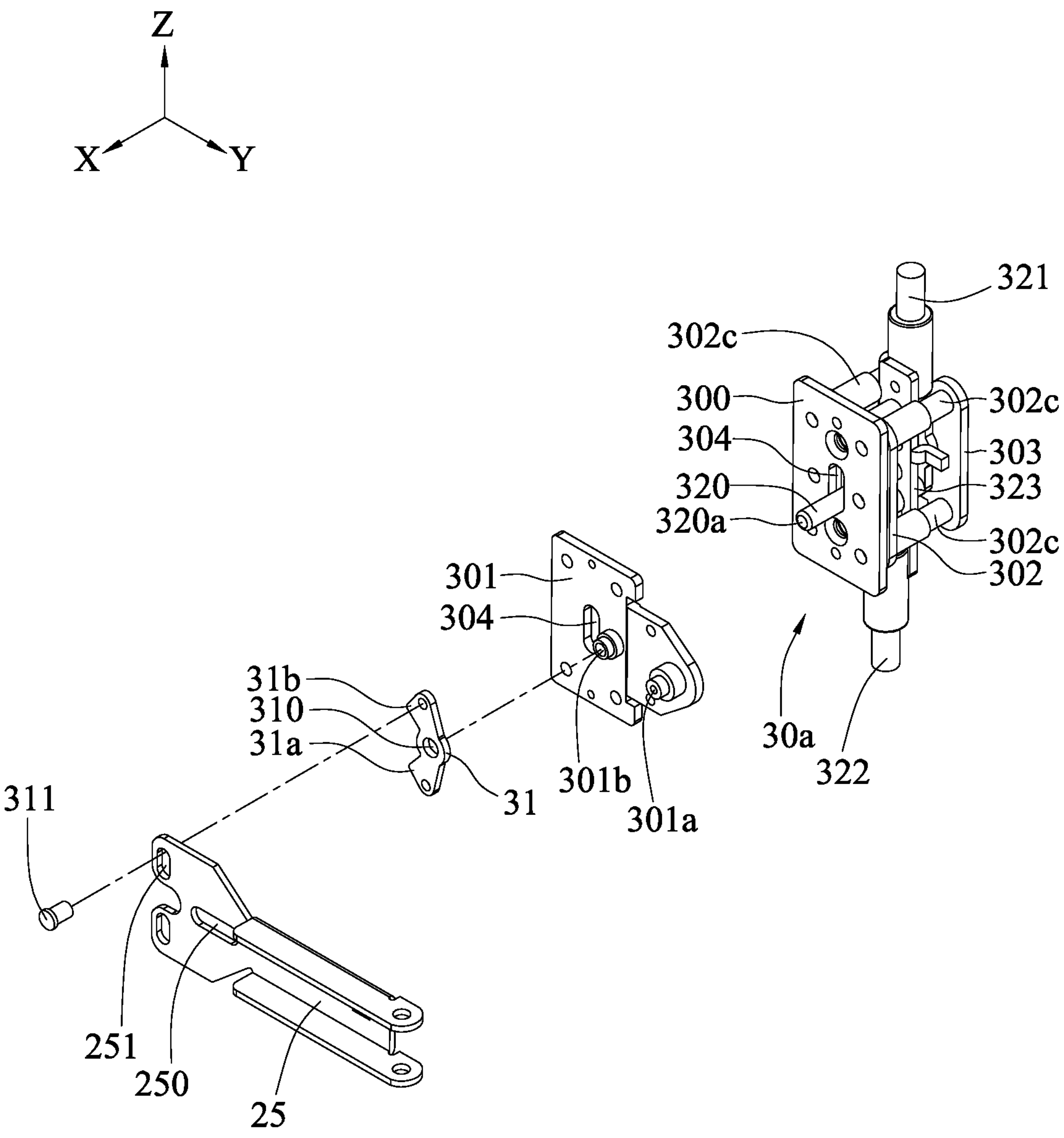
FIG. 3B is a schematic exploded perspective view of FIG. 3A.
Figure 3C:
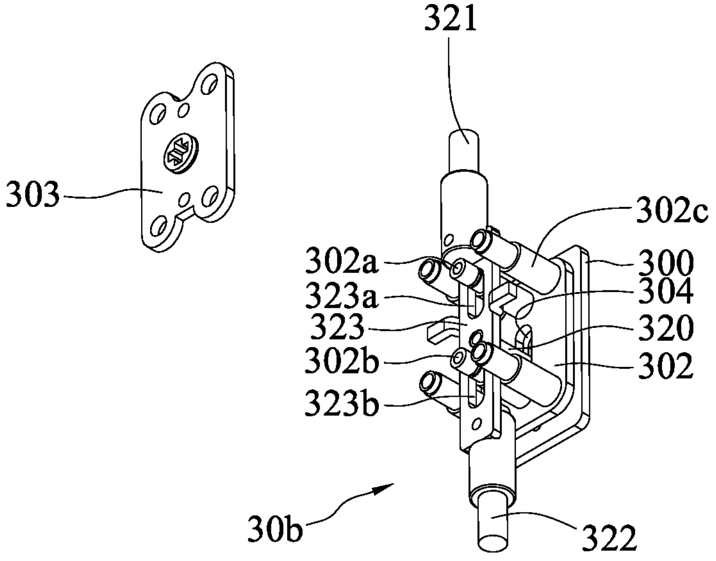
FIG. 3C is a schematic partial front perspective view of a door lock device according to the present disclosure.
Figure 3D:
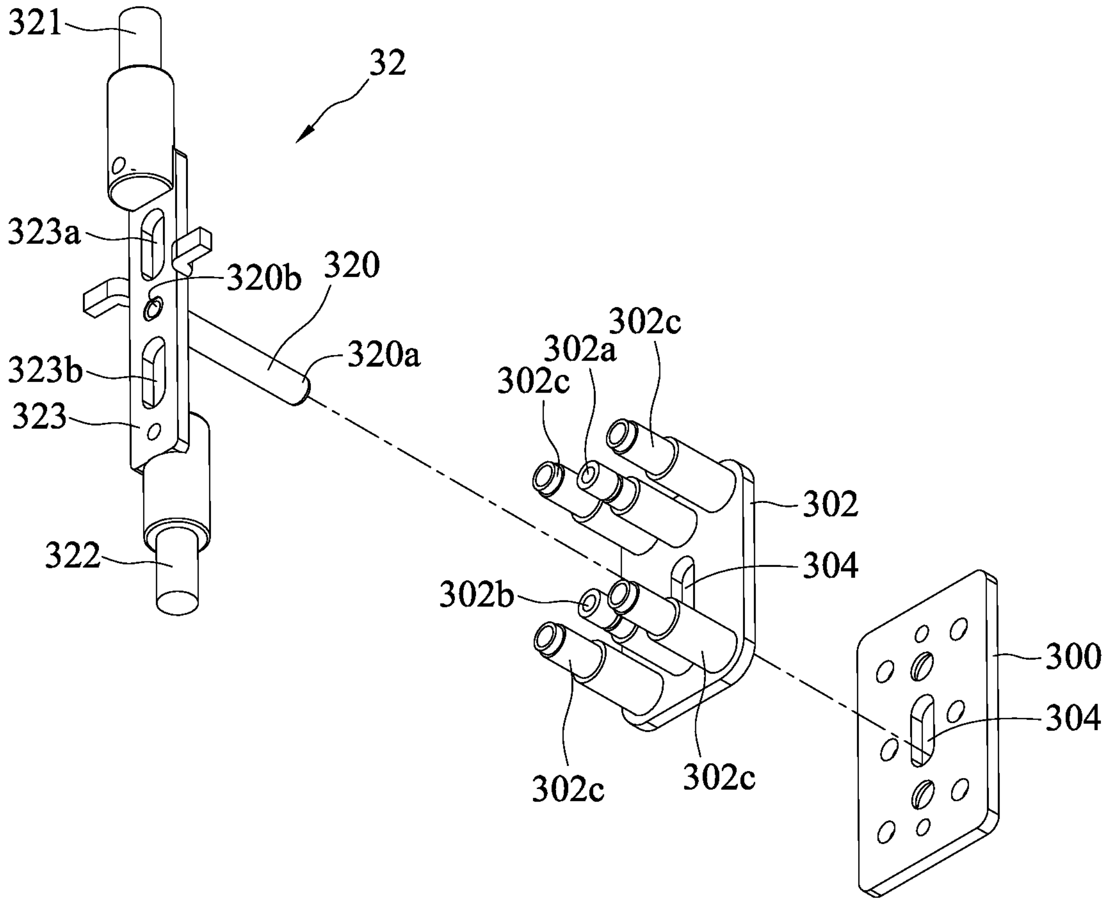
FIG. 3D is a schematic partially exploded perspective view of FIG. 3C.

Referring to FIGS. 3A, 3A', 3B, 3C and 3D, the acting assembly 3 has a carrier structure 30, a driving member 31 arranged on the carrier structure 30, and an acting member 32 arranged on the carrier structure 30 and interlocked with the driving member 31. The carrier structure 30 has a first side 30*a* and a second side 30*b* opposite to the first side 30*a*. The driving member 31 is disposed on the first side 30*a* of the carrier structure 30, and the acting member 32 is disposed on the second side 30*b* of the carrier structure 30.

In an embodiment, the carrier structure 30 has a base plate 300 fastened to the outer surface of the door frame 90 (rod body 90*a*), a first carrier 301 securely connected to the base plate 300 and located outside the door frame 90 for carrying the driving member 31, and a second carrier 302 securely connected to the inner wall of the door frame 90 (rod body 90*a*) and located on the second side 30*b* for carrying the acting member 32. For example, the first carrier 301 is a plate body with a bump 301*a* (engaged with the rail 250 of the passive member 25) and a shaft body 301*b* axially connected to the driving member 31. The second carrier 302 is a plate body separated from the base plate 300. A first acting post 302*a* and a second acting post 302*b* are vertically disposed on the second carrier 302 in a direction away from the base plate 300 and engaged with the acting member 32. A plurality of (for example, four) support posts 302*c* are vertically disposed on corners of the second carrier 302 in a direction away from the base plate 300 and connected to a cover member 303. The cover member 303 is also securely connected to the first acting post 302*a* and the second acting post 302*b*.

Further, the driving member 31 has an axially connecting portion 310 such as an opening for axially connecting with the shaft body 301*b* so as to allow the driving member 31 to rotate relative to the shaft body 301*b* of the first carrier 301 and hence push the acting member 32. For example, the driving member 31 further has such as a post-shaped (or screw) guide portion 311, and the passive member 25 is provided with a guide hole 251 cooperating with the guide portion 311 so as to allow the guide portion 311 to displace in the guide hole 251, thus causing the passive member 25 to push or pull the driving member 31. As such, the driving member 31 swings based on the axially connecting portion 310. The driving member 31 is a lever, the axially connecting portion 310 is disposed in the middle thereof, and a first driving portion 31*a* and a second driving portion 31*b* extend from two opposite sides of the axially connecting portion 310. The guide portion 311 is disposed on the second driving portion 31*b*, and the first driving portion 31*a* pushes the acting member 32.

Furthermore, the acting member 32 has an acting body 320 interlocked with the driving member 31 and an acting portion 323 for disposing the acting body 320 and engaging with the second carrier 302. For example, the acting body 320 is in the form of a rod, which has a first end 320*a* and a second end 320*b* opposite to the first end 320*a*. The acting body 320 passes through the carrier structure 30 (the second carrier 302, the base plate 300 and the first carrier 301) such that the first end 320*a* and the second end 320*b* protrude from the first side 30*a* and the second side 30*b* of the carrier structure 30, respectively, thus causing the first driving portion 31*a* and the second driving portion 31*b* of the driving member 31 to push the first end 320*a*. The acting portion 323 is securely connected to the second end 320*b*. The carrier structure 30 has an acting guide hole 304 communicating the second carrier 302, the base plate 300 and the first carrier 301 so as to allow the acting body 320 to pass through the acting guide hole 304. As such, when the driving member 31 pushes the first end 320*a* of the acting body 320, the acting body 320 can displace in the acting guide hole 304.

Further, the acting portion 323 is in the form of a plate, the middle of which is securely connected to the second end 320*b* of the acting body 320 and two opposite sides of which have a first acting hole 323*a* and a second acting hole 323*b* cooperating with the first acting post 302*a* and the second acting post 302*b*, respectively. As such, the first acting post 302*a* and the second acting post 302*b* can displace in the first acting hole 323*a* and the second acting hole 323*b*, respectively, so as to cause the acting portion 323 to displace relative to the carrier structure 30. For example, the acting member 32 further has a rod-shaped first external connection portion 321 and a rod-shaped second external connection portion 322 disposed on the two opposite sides of the acting portion 323 (beside the first acting hole 323*a* and the second acting hole 323*b*), respectively, so as to connect with the lock assembly 4. When the acting body 320 displaces in the acting guide hole 304, the acting portion 323 is driven to displace together with the first external connection portion 321 and the second external connection portion 322 in the same direction.

The lock assembly 4 has a first lock structure 4*a* connected to the first external connection portion 321 and buried inside an upper portion of the door frame 90, and a second lock structure 4*b* connected to the second external connection portion 322 and buried inside a lower portion of the door frame 90.

In an embodiment, the lock assembly 4 is in the form of top and bottom locks. The first lock structure 4*a* serves as a top lock to lock the door structure 9 to an upper side of the door and the second lock structure 4*b* serves as a bottom lock to lock the door structure 9 to the ground. For example, referring to FIG. 4A, a first carrier base 7 is disposed on the upper side of the door, and a roller 70 is axially connected inside the first carrier base 7 and operating in cooperation with the first lock structure 4*a*. Referring to FIG. 4B, a second carrier base 8 is buried in the ground and a receiving opening 80 is formed on a top surface of the second carrier base 8 and exposed from the ground so as to operate in cooperation with the second lock structure 4*b*.

The first lock structure 4*a* has a first body 40*a* fastened onto the inner wall of the rod body 90*a*, an active member 41 disposed inside the rod body 90*a*, an actuating member 42 axially connected to the first body 40*a* and operating in cooperation with the active member 41, a lock main body 44 axially connected to the first body 40*a* and operating in cooperation with the roller 70, and a first rod member 43*a* connecting the active member 41 and the first external connection portion 321.

In an embodiment, the first body 40*a* is in the form of an n-shaped plate, and first axial holes 401 and second axial holes 402 are symmetrically formed on two opposite sides of the first body 40*a* such that the actuating member 42 is axially connected to the first axial holes 401 and the lock main body 44 is axially connected to the second axial holes 402. For example, the actuating member 42 is in the form of a swinging block, which has a first rotating axis 420 axially connected to the first axial holes 401, and the lock main body 44 is in the form of a clamp, which has a second rotating axis 440 axially connected to the second axial holes 402. The actuating member 42 has an abutting portion 421 formed on one side of the first rotating axis 420, and the lock main body 44 has a force bearing portion 441 formed on one side of the second rotating axis 440. As such, when the actuating member 42 swings, the abutting portion 421 impacts the force bearing portion 441 (in an acting direction L2 of FIG. 4A') so as to cause the lock main body 44 to rotate (in an acting direction F3 of FIG. 4A').

Further, the active member 41 is of an elongated shape, which has a first active portion 41*a* and a second active portion 41*b* connected to the first active portion 41*a*. The first active portion 41*a* is sleeved on the first rod member 43*a*, and the second active portion 41*b* is movably engaged with the actuating member 42. For example, the actuating member 42 has a rod-shaped displacement portion 422 formed on the other side of the first rotating axis 420, and the second active portion 41*b* has a displacement hole 410 engaged with the displacement portion 422. When the first external connection portion 321 drives the first rod member 43*a* to push the first active portion 41*a* upward (in an acting direction F2 of FIG. 4A'), the first active portion 41*a* pushes the second active portion 41*b* upward and the displacement portion 422 displaces in the displacement hole 410 (in an acting direction L1 of FIG. 4A'), thereby causing the second active portion 41*b* to push the actuating member 42 to rotate (in an acting direction L2 of FIG. 4A').

Further, the lock main body 44 has a clamping opening 442 protruding from the rod body 90*a* for receiving the roller 70. The inner wall 442*a* of the clamping opening 442 has a curved shape. As such, when the lock main body 44 rotates (in an acting direction F3 of FIG. 4A'), the clamping opening 442 and the roller 70 slide and separate from one another. That is, the lock main body 44 moves out of the roller 70.

The second lock structure 4*b* has a second body 40*b* fastened onto the inner wall of the rod body 90*a*, an active rod 45 disposed inside the rod body 90*a*, a supporting member 46 fastened onto the second body 40*b*, a lock head 47 securely connected to the active rod 45 and protruding from the rod body 90*a* to operate in cooperation with the second carrier base 8, an elastic element 48 fastened to the supporting member 46, and a second rod member 43*b* connecting the active rod 45 and the second external connection portion 322.

In an embodiment, the second body 40*b* is in the form of an n-shaped plate for receiving the active rod 45, the supporting member 46 and the elastic element 48. The second rod member 43*b* and the lock head 47 protrude from the second body 40*b*.

Further, one end 45*a* of the active rod 45 is connected to the second rod member 43*b* and the other end 45*b* of the active rod 45 is connected to lock head 47. For example, a first position limiting member 49*a* and a second position limiting member 49*b* are arranged between the two ends 45*a*, 45*b* of the active rod 45, respectively, so as to define an action area A, and the supporting member 46 and the elastic element 48 are arranged in the action area A. The first position limiting member 49*a* and the second position limiting member 49*b* are rectangular-shaped sheet bodies, the elastic element 48 is a return spring, and the supporting member 46 is a rectangular block. The active rod 45 passes through the supporting member 46, the elastic element 48, the first position limiting member 49*a* and the second position limiting member 49*b*, and the opposite ends of the elastic element 48 are securely connected to the supporting member 46 and the first position limiting member 49*a*, respectively.

Further, the lock head 47 is located outside the action area A (the second position limiting member 49*b*) and moveably cooperates with the receiving opening 80. For example, the lock head 47 can be inserted into or pulled out of the receiving opening 80. When the second external connection portion 322 drives the second rod member 43*b* to pull the active rod 45 upward (in an acting direction F2 of FIG. 4B), the active rod 45 also pulls the lock head 47 upward. As such, the lock head 47 moves away from the receiving opening 80, and the elastic element 48 goes into a compressed state.

It should be noted that the top and bottom locks have various types and the structure of the carrier base corresponding to the top and bottom locks can be adjusted according to the practical need and is not limited to the above.

Therefore, when using the door lock device 1, the user applies a pushing force P to the handle portion 11 (as shown in FIG. 1A). As such, the handle portion 11 pushes the actuating members 21 of the actuating mechanisms 2*a*, 2*b* (as shown in FIG. 2A) so as to drive the rotating members 20 to rotate. Therefore, the second arm portions 202 drive the interlocking member 23 and the connecting member 24 to move linearly in a direction away from the acting assembly 3 (in an acting direction F1 of FIG. 2A), thus causing the passive member 25 to move in a direction away from the lock assembly 4 through the cooperation of the rail 250 and the bump 301*a* (in an acting direction F1 of FIGS. 2A and 3A).

At this point, the guide hole 251 of the passive member 25 actuates the guide portion 311 and hence the passive member 25 pulls the second driving portion 31*b* of the driving member 31 so as to cause the driving member 31 to swing. As such, the first driving portion 31*a* impacts the acting body 320 of the acting member 32 upward (in an acting direction R of FIG. 3A') and the acting body 320 displaces linearly upward along the acting guide hole 304 so as to drive the acting portion 323 to displace together with the first external connection portion 321 and the second external connection portion 322 in the same direction (in an acting direction F2 of FIGS. 3A and 3A'). At this point, the first driving portion 31*a* supports and abuts against the acting body 320 at a destination point.

As such, the first external connection portion 321 pushes the first rod member 43*a* upward (in an acting direction F2 of FIGS. 1A and 4A') and hence the active member 41 pushes the actuating member 42 to rotate. The actuating member 42 impacts the lock main body 44 so as to separate the lock main body 44 from the roller 70 (in an acting direction F3 of FIG. 4A'), thereby unlocking the first lock structure 4*a*. At the same time, the second external connection portion 322 drives the second rod member 43*b* to pull the active rod 45 upward. As such, the lock head 47 leaves the receiving opening 80 and consequently the second lock structure 4*b* is unlocked (in acting directions F2, F4 of FIG. 1A).

After the user releases the handle portion 11, the operation assembly 2 returns to the original position (as shown in FIG. 3A) so as to cause the acting assembly 3 and the lock assembly 2 to return to the original states (as shown in FIG. 3A). It should be noted that after the handle portion 11 is released, the driving member 31 automatically returns to its original state (as shown in FIG. 3A'). The first driving portion 31*a* does not support and abut against the acting body 320, and thus the acting body 320 descends from the target point to the original position. Therefore, the returning of the acting body 320 to its original state is not caused by impact of the second driving portion 31*b* of the driving member 31.

Figure 4A:
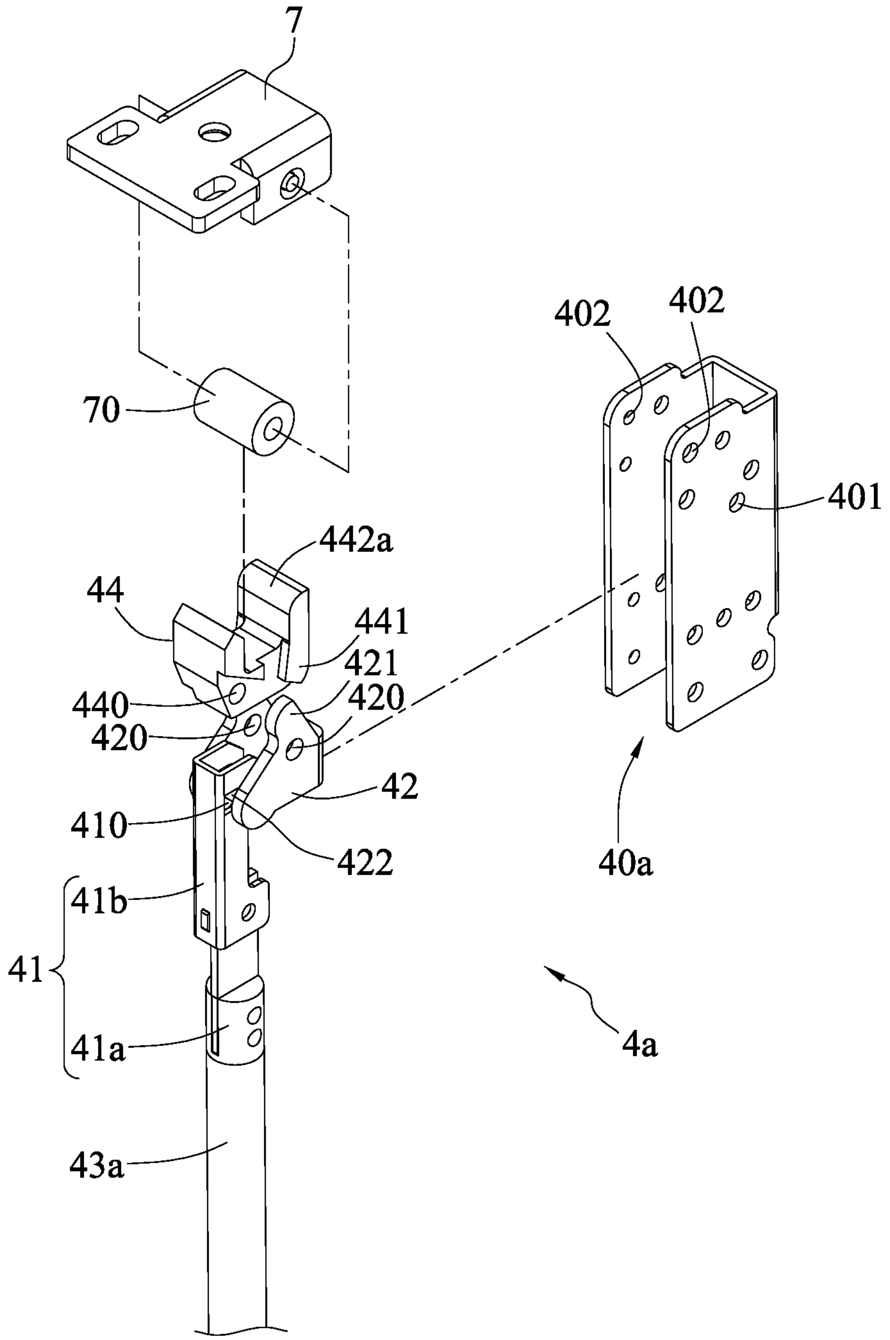
FIG. 4A is a schematic partial front view of a door lock device in operation according to the present disclosure.
Figure 4A:
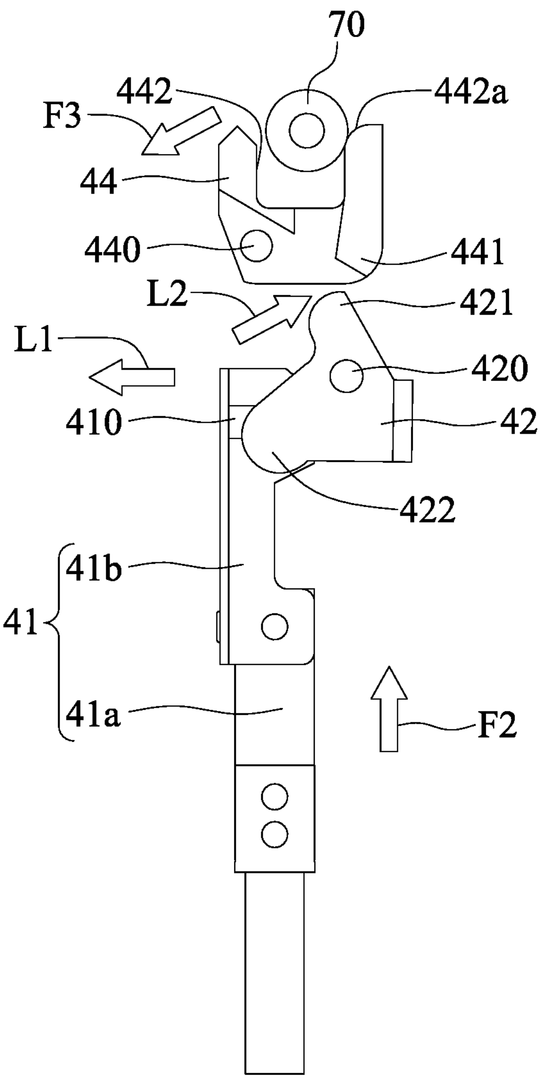
Figure 4B:
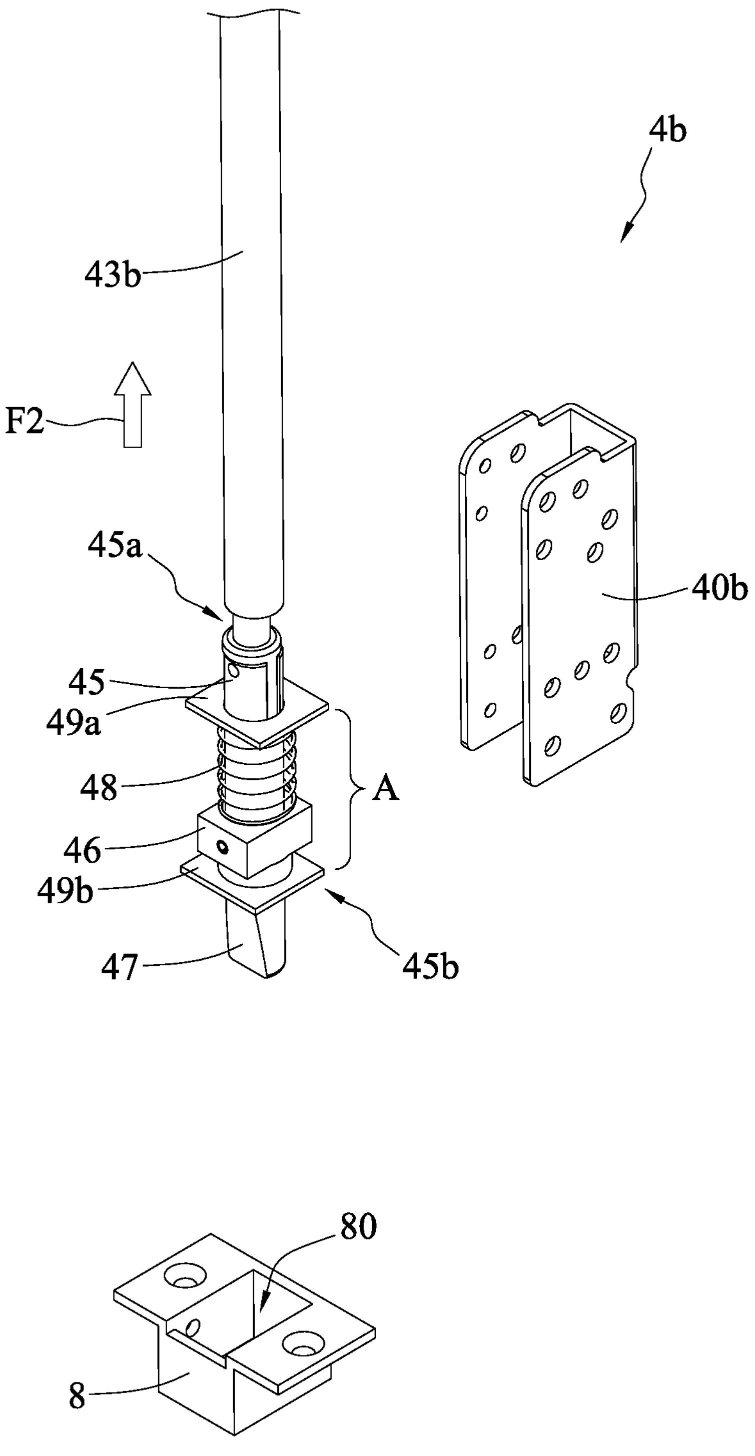
FIG. 4B is a schematic partial rear view of a door lock device in operation according to the present disclosure.

Further, after the door structure 9 is pushed open and when the door plate 91 is to be closed, as the U-shaped lock main body 44 touches the roller 70, the door closing force causes the lock main body 44 to stand up so as to return to its original state (as shown in FIG. 4A'). At this point, the force bearing portion 441 impacts the abutting portion 421 so as to provide a downward back force (in an acting direction opposite to F2 of FIG. 4A'), thereby causing the active member 41, the first rod member 43*a*, the first external connection portion 321, the acting portion 323, the second external connection portion 322, the second rod member 43*b* and the active rod 45 to move together. Therefore, the lock head 47 extends toward the ground (in an acting direction opposite to F2 of FIG. 4B) into the receiving opening 80 and the door lock operation is completed.

Therefore, the acting assembly 3 of the door lock device 1 of the present disclosure allows the top and bottom lock structures of the lock assembly 4 (the first lock structure 4*a* and the second lock structure 4*b*) to be unlocked synchronously (in acting directions F2, F4 of FIG. 1A). Hence, the escape door (for example, the door structure 9) can be opened quickly so as to facilitate emergency escape.

The above-described descriptions of the detailed embodiments are to illustrate the preferred implementation according to the present disclosure, and it is not to limit the scope of the present disclosure. Accordingly, all modifications and variations completed by those with ordinary skill in the art should fall within the scope of the present disclosure defined by the appended claims.

What is claimed is:

1. A door lock device, comprising:

a lock assembly in a form of top and bottom locks comprising a first lock structure as the top lock to lock a door structure to an upper side of a door and a second lock structure as the bottom lock to lock the door structure to a ground, wherein a first carrier base is disposed on the upper side of the door, and a roller is axially connected inside the first carrier base;

an acting assembly interlocked with the first lock structure and the second lock structure, and including a carrier structure, a driving member and an acting member, wherein the carrier structure has a first side and a second side opposite to the first side, the driving member is disposed on the first side, and the acting member is disposed on the second side, wherein the carrier structure further has a bump and a shaft body; and an operation assembly interlocked with the acting assembly to unlock the first lock structure and the second lock structure synchronously, and comprising at least one actuating mechanism and one interlocking mechanism interlocking the actuating mechanism and the driving member, wherein the interlocking mechanism has an interlocking member connected to the actuating mechanism and a passive member connected to the interlocking member, wherein the passive member is provided with a rail and a guide hole, wherein the driving member has an axially connecting portion, a guide portion, a first driving portion and a second driving portion, the first driving portion and the second driving portion extend from two opposite sides of the axially connecting portion, the axially connection portion axially connected to the shaft body, the guide portion is displaced in the guide hole and disposed on the second driving portion, the first driving portion pushes the acting member, and the bump is displaced in the rail, wherein the first lock structure has a first body, an active member, an actuating member axially connected to the first body along a first rotating axis and operating in cooperation with the active member, a lock main body axially connected to the first body along a second rotating axis and operating in cooperation with the roller, and a first rod member connecting the active member and the acting assembly, wherein the actuating member has an abutting portion formed on one side of the first rotating axis, the lock main body is U-shaped and has a force bearing portion and a clamping opening for receiving the roller, and the force bearing portion is formed on one side of the second rotating axis, and wherein when using the door lock device, the roller is positioned on the first carrier base without moving translationally relative to the door, the actuating member swings, the abutting portion impacts the force bearing portion so as to cause the lock main body to rotate, and the clamping opening separates and moves away from the roller and moves out of the first carrier base in a state of unlocking the first lock structure.

2. The door lock device of claim 1, wherein the driving member is used to push the acting member in a rotatable manner.

3. The door lock device of claim 1, wherein the acting member has an acting body interlocked with the driving member and an acting portion disposing the acting body and interlocked with the lock assembly.

4. The door lock device of claim 3, wherein the driving member is used to push the acting body to cause the acting portion to move synchronously with the first lock structure and the second lock structure.

5. The door lock device of claim 1, wherein the operation assembly is displaced relative to the acting assembly to move the acting assembly.

6. The door lock device of claim 1, wherein the actuating mechanism has a rotating member, another actuating member and a fastening member.

7. The door lock device of claim 6, wherein the rotating member has a wing portion with a first arm portion and a second arm portion connected to different sides of the wing portion.

8. The door lock device of claim 7, wherein the wing portion is connected to the fastening member.

9. The door lock device of claim 8, wherein the first arm portion is connected to the another actuating member, and the second arm portion is connected to the interlocking mechanism.

10. The door lock device of claim 1, wherein one side of the passive member is connected to the interlocking member and another side of the passive member is displaceably connected to the acting assembly.

11. The door lock device of claim 1, further comprising a handle assembly encapsulating the operation assembly.

* * * * *